United States Patent [19]

Carver et al.

[11] 4,030,208

[45] June 21, 1977

[54] SEAT VIBRATION SYSTEM FOR SIMULATING AIRCRAFT BUFFETING

[75] Inventors: Fred F. Carver, R.D. 1, Box A317, Chenango Forks, N.Y. 13746; Carl E. Hoyt, 8081 Hillandale Drive, San Diego, Calif. 92120

[73] Assignee: The Singer Company, Binghamton, N.Y.

[22] Filed: Jan. 15, 1976

[21] Appl. No.: 649,447

[52] U.S. Cl. .............................................. 35/12 F
[51] Int. Cl.² ......................................... G09B 9/08
[58] Field of Search ........... 128/33; 35/11 R, 11 A, 35/12 E, 12 H, 12 W, 12 P; 272/10, 16, 17, 24, 36–40

[56] References Cited

UNITED STATES PATENTS

| | | | |
|---|---|---|---|
| 2,700,382 | 1/1955 | Brand | 128/33 |
| 2,787,842 | 4/1957 | Smith et al. | 35/12 W |
| 3,164,911 | 1/1965 | Vaughen | 35/12 K |
| 3,246,403 | 4/1966 | Vaughen | 35/12 K |
| 3,376,658 | 4/1968 | Thurner | 35/12 K |
| 3,378,939 | 4/1968 | Carey et al. | 35/12 H |

*Primary Examiner*—Richard C. Pinkham
*Assistant Examiner*—Vance Y. Hum
*Attorney, Agent, or Firm*—Jeffrey Rothenberg; James C. Kesterson

[57] ABSTRACT

A system for vibrating a seat within the cockpit of a flight trainer to simulate aircraft buffeting. The seat is mounted at its rear on a pair of linear bearings which permit z axis movement of the seat relative to the trainer cockpit. A hydraulic actuator, acting through a bell crank and link, vibrates the seat up and down under computer control. The computer determines the required seat vibration frequency and amplitude as a function of simulated aircraft angle of attack and maneuvering load factor. Analog signals representing the computed vibration frequency and amplitude are fed to a voltage controlled ramp generator which provides a seat driving signal to the hydraulic actuator through a closed loop servo system.

8 Claims, 4 Drawing Figures

SEAT VIBRATION SYSTEM FOR SIMULATING AIRCRAFT BUFFETING

The invention herein described was made in the course of or under a contract or subcontract thereunder, with the Department of the Air Force.

BACKGROUND OF THE INVENTION

1. Field of the Invention

This invention relates to flight simulation and more particularly to a seat vibrating system for simulating aircraft buffeting in a grounded flight trainer.

2. Description of the Prior Art

Over the years, the art of flight simulation has advanced from the early bellows-driven LINK trainers to today's highly sophisticated, computer controlled, flight and mission simulators. With ever increasing versatility and fidelity, today's simulators duplicate a broad spectrum of flight conditions, and aircraft performance in both normal and malfunction modes. Employing advanced motion systems, digital computers, visual displays and the like, present day simulators are able to generate and integrate a multiplicity of realistic flight cues to provide effective training for flight crew members.

One flight cue sometimes simulated is aircraft buffeting. At relatively high angles of attack, most aircraft will vibrate due to airflow over the wings. These vibrations are transmitted through the aircraft structure to the pilot who uses the intensity (frequency and amplitude) of the vibrations as a cue to the aircraft's attitude with respect to its maneuvering limits. Aircraft buffeting gives the pilot a warning of impending stall or loss of control.

In the past, attempts have been made to simulate aircraft buffeting by driving the motion system or base of a flight trainer to vibrate the total cockpit. This old method suffers from a number of significant disadvantages. Foremost of these is that the motion system usually does not have the frequency response capabilities to do a good job of simulating the buffeting encountered in the aircraft. Generally, only one frequency is available with a motion system; namely, one-half the update rate of the motion drive signal. However, the buffet frequency for a particular aircraft is not fixed, but, to the contrary, normally varies with angle of attack and flight conditions. Similarly, the frequency range of actual aircraft buffeting generally exceeds the maximum frequency available with a motion system drive.

A number of prior art simulators have resorted to special motion bases to vibrate a simulated aircraft fuselage. U.S. Nos. 2,787,842 and 3,376,658 illustrate this approach. Although these patented systems are capable of simulating rough air and helicopter blade stall, respectively, they apparently do so at the expense of normal flight simulation. Moreover, by vibrating the whole cockpit, these systems expose sensitive electronic and optical components, commonly mounted in and on the simulator cockpit, to vibration damage.

To overcome the latter disadvantage, one might consider mounting the pilot's seat on a moveable section of the cockpit floor; which section could be vibrated relative to the remainder of the cockpit, as was done in the early 1960's on an Edwards Air Force Base Space Flight Trainer. However, there are many aircraft cockpit arrangements where it would be extremely difficult to attach the seat to the cockpit floor. On, for example, many military aircraft with pilot ejection systems, the seat is mounted on ejection rails rather than on the floor. Further, to provide the required seat vibration with such a moveable floor section and still allow the pilot to adjust his seat in a normal manner, would require an ungainly and unduely complex system.

Similar seat adjustment problems are presented by a vibration mechanism affixed to the cockpit floor beneath the seat pan, such as that shown in British Pat. No. 1,004,005. Likewise limited space between the seat and the cockpit floor makes a scheme involving an actuator mounted to the underside of the seat pan (see British Pat. No. 979,495) impractical in many situations.

Another approach to simulating aircraft buffet is illustrated in U.S. Pat. No. 3,270,440. In the flight simulator shown therein, buffeting is simulated by creating a pulsating pressure in the air cells of the pilot's seat. Since both the frequency and amplitude of seat pulsation is fixed, this prior art system does not effectively simulate aircraft buffeting.

SUMMARY OF THE INVENTION

The seat vibration system of the present invention overcomes the disadvantages of the prior art schemes and provides realistic simulation of aircraft buffeting. According to the current invention, a pilot's seat is mounted at its rear on linear bearings which permit vertical (i.e., z-axis) movement of the seat relative to the cockpit, without any loss of cockpit fidelity or interference with normal seat adjustment. The seat is vibrated by a simple, straight forward mechanical arrangement which permits larger deflections and more control over seat motion than a vibrating floor scheme would. Moving just the seat, vibrates simulator components mounted in the cockpit area considerably less than vibrating the whole fuselage does. Since all of the mechanical hardware for vibrating the seat can be mounted within the fuselage, the seat vibration system of the current invention is compatible with any motion base. Further, the instant invention varies both the frequency and amplitude of seat vibration with simulated flight conditions, resulting in a much more realistic simulation of aircraft buffeting.

According to the invention, these advantages are achieved by controllably vibrating a rear supported seat within the cockpit of a flight trainer. An actuator, acting through a linkage mechanism, vibrates the seat up and down along linear bearings. The frequency and amplitude of seat vibration is made to vary with simulated flight conditions.

One object of the present invention is to provide a seat vibration system which realistically simulates aircraft buffeting.

Another object is to provide a system for vibrating a seat in a simulated cockpit with a frequency and amplitude that varies with simulated flight conditions.

Still another object is to simulate aircraft buffeting without compromising cockpit fidelity or damaging sensitive electronic and optical components.

Yet another object is to provide a mechanism which can vibrate a seat that is not mounted on the floor of a cockpit, which does not interfere with normal seat adjustments, and is compatible with any standard motion system.

A further object is to provide a simple, economical, safe and straight-forward seat vibration system particularly useful in simulating the buffeting experienced in high performance aircraft and military aircraft with pilot ejection systems.

A still further object is to provide a control circuit for driving said seat which is closed looped, limits seat displacement to a safe region, and accurately converts computed buffet signals into z-axis movement of the seat.

Other objects and advantages of the invention will, in part, be obvious and will, in part, appear hereinafter.

BRIEF DESCRIPTION OF THE DRAWINGS

These and other features of the present invention will be more clearly understood from consideration of the following description taken in conjunction with the accompanying drawings in which.

DETAILED DESCRIPTION

Figure 1:
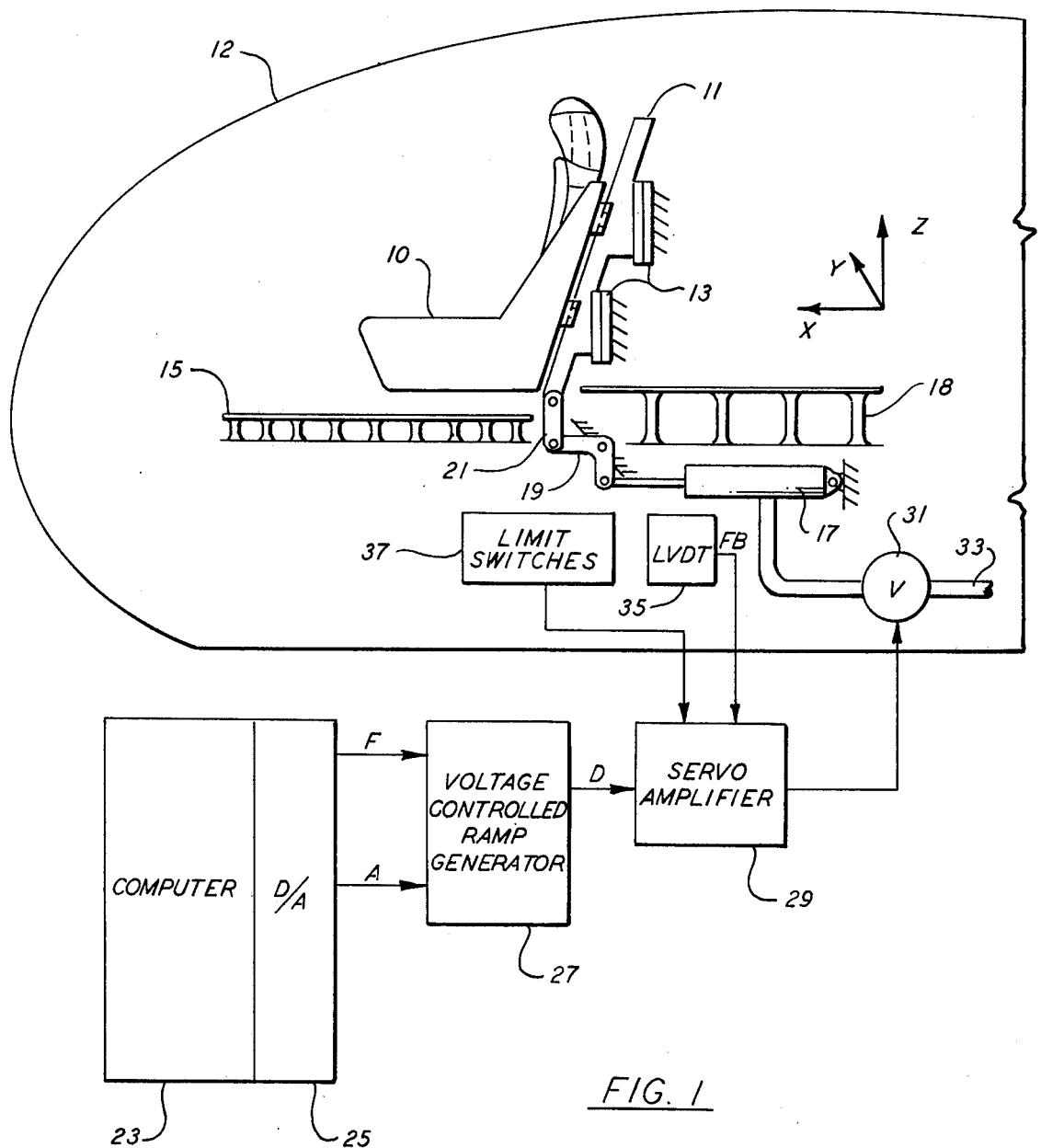
FIG. 1 is a drawing, in diagrammatic form, of the seat vibration system of the current invention.

FIG. 1 illustrates the seat vibration system of the current invention as it could typically be employed to simulate buffeting in a high performance aircraft.

In a high performance aircraft, the pilot's seat is mounted on rails that guide the seat out of the aircraft during an emergency ejection. The rails are rigidly fastened to the aircraft bulkhead and are oriented at an angle to minimize the air load on a pilot as he enters the aircraft slipstream during an ejection.

According to the instant invention, a seat 10 is mounted on a similarly oriented ejection rail 11 in a simulated cockpit 12. Cockpit 12 typically contains working reproductions of the controls and indicators found in the actual aircraft. The cockpit may be mounted on a conventional motion base (not shown) for repositioning according to the equations of motion for the particular aircraft being simulated, as is well known in the art.

Seat 10 and railing 11 may be actual aircraft equipment. As shown in FIG. 1, rail 11 has been modified to ride on two linear bearings 13. Since the aircraft buffeting motion is normally perpendicular to the cockpit floor 15, bearings 13 are oriented to permit bi-directional motion of seat 10 and railing 11 along the aircraft's z axis.

A double acting, high frequency, hydraulic actuator 17, preferably mounted within the fuselage under the rear floor section 18, provides vibratory motion to seat 10. the ram of actuator 17 is connected by a bell crank 19 and link 21 to the bottom of ejection rail 11. Hydraulic ram actuation is thus translated into Z axis seat movement.

A computer 23 determines the required seat vibration frequency and amplitude as a function of the simulated aircraft angle of attack and maneuvering load factor. Computer 23 may represent any digital or analog computer capable of generating the required vibration controlling signals in real time. In most applications, the computer which controls the total aircraft simulator will be used to operate the seat vibration system. As an example, a Systems Engineering Laboratories' Systems 86 digital computer could be used as the computational device. This digital computer could drive the hydraulic actuator directly; however, since the maximum frequency the computer can communicate with an analog device is quite low, the signals representing the computed seat response are preferably transmitted through a digital-to-analog converter 25. This D/A converts digital signals from computer 23 into analog signals representing the desired frequency (F) and amplitude (A) of seat vibration.

A voltage controlled ramp generator 27 converts the frequency and amplitude signals from D/A 25 into a ramp drive signal (D). This drive signal is applied through a closed-loop servo amplifier 29, to a servo valve 31 in the hydraulic line 33 feeding actuator 17. A linear variable differential transformer (LVDT) or other position follow-up sensor 35, provides a feedback signal (FB), representing actual hydraulic ram displacement, to servo amplifier 29. Limit switches 37, strategically placed along the path of travel of bell crank 19, are also connected to servo amplifier 29, to ensure that seat displacement is constrained to a safe range.

In an operational aircraft, buffet due to high angle of attack flight is normally detected by the pilot when the cockpit starts to vibrate. As the angle of attack is increased to still higher angles of attack, the magnitude and frequency of the vibration will usually change. Consider, by way of example, the vibration response of the F-4. The aircraft will start to buffet with a low amplitude and high frequency at 8° to 12° angle of attack. As the angle of attack increases, the vibration amplitude increases and frequency decreases. These motions are transmitted through the aircraft's structure to the pilot who uses them as an aid to get the maximum possible maneuvering performance out of the aircraft. Most aircraft give the pilot a buffet warning of an impending stall or loss of control but the specific vibration characteristics vary from one type of aircraft to another.

To simulate the buffeting experienced in a particular aircraft, computer 23 develops a function of angle of attack ($\alpha$), which describes how the aircraft's vibration characteristics vary with this flight condition. This function of $\alpha$ is used to generate the desired frequency of seat vibration, subject to a limiting range, e.g., 3 to 20 herz. This function is also combined in the computer with a function of aircraft vertical acceleration (Z) and a randomly generated number to give the desired instantaneous buffet intensity. Since the amplitude and frequency of the buffet drive signal are interrelated, as hereinafter described, in the control circuitry, the computer combines the desired intensity and frequency into two interrelated commands which are then output to the D/A. These commands are empirically derived based on the characteristics of the control circuitry.

D/A 25 converts these commands into a pair of analog output signals. One of these signals primarily controls the frequency and the other the amplitude of the movement of the pilot's seat. Ramp generator 27 accepts the two outputs from the D/A and converts them into a single, ramp-shaped drive signal, as more fully explained below. Servo amplifier 20 compares this drive signal with a feedback signal from position sensing device 35. The servo amplifier then generates an error signal that actuates hydraulic valve 31, which in turn controls the operation of actuator 17.

As previously described, the ram of hydraulic actuator 17 is mechanically linked to the bottom of ejection rail 11. Thus seat 10, which is mounted on ejection rail 11, is made to vibrate up and down with a frequency and amplitude that varies according to simulated flight conditions.

Figure 2:
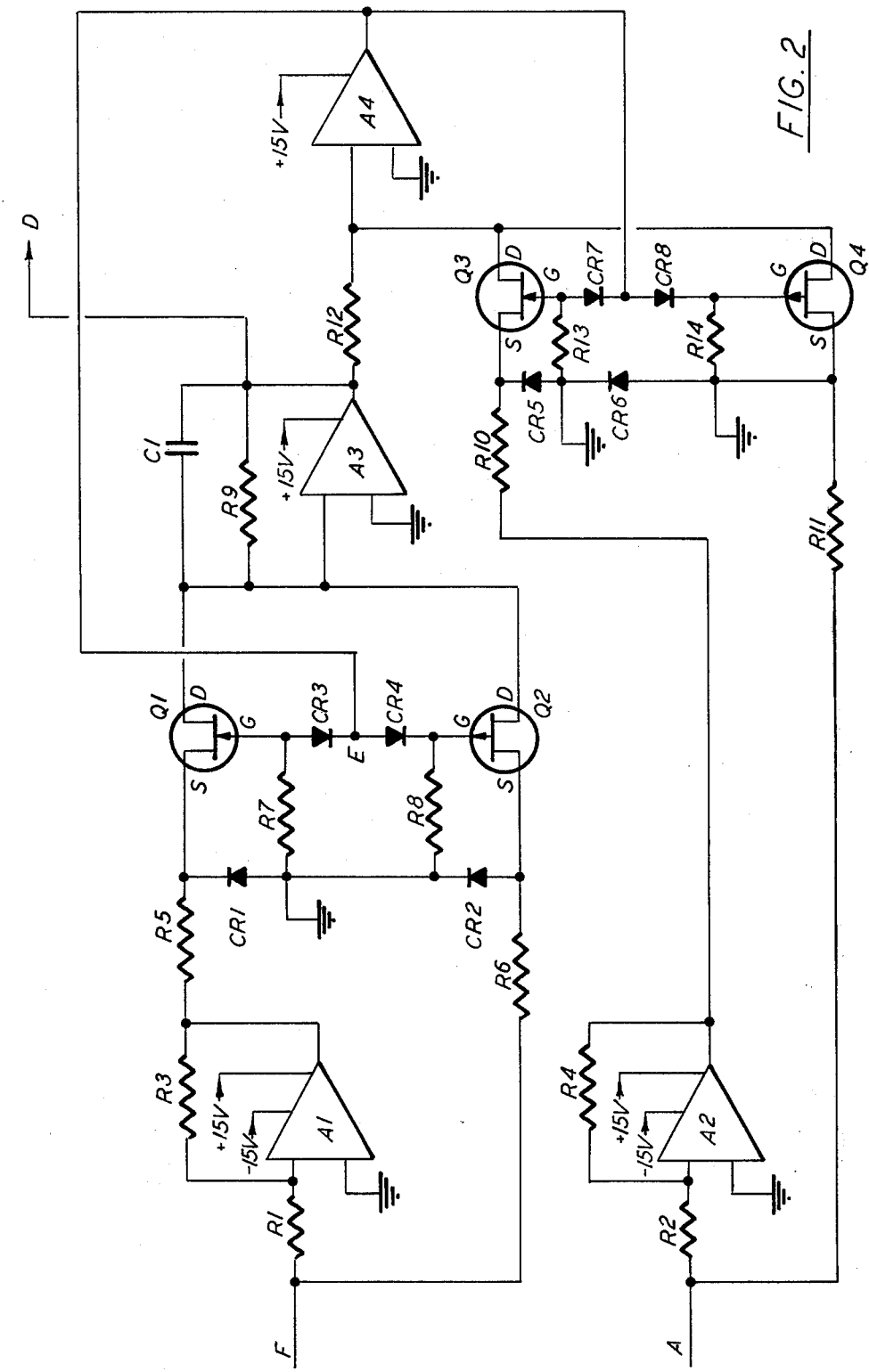
FIG. 2 illustrates a voltage controlled ramp generator useful in the current invention.

A preferred voltage controlled ramp generator for converting the frequency and amplitude signals from the computer into a drive signal is illustrated in FIG. 2. The two analog output signals transmitted by D/A 25 typically have values in the ramp of 0 to +10 volts. The output signal from the voltage controlled ramp generator is a ramp linear from a positive ramp peak to a negative ramp peak. (See Waveform D in FIG. 3.) In a typical application, the amplitude of this output signal can vary from 0 to 20 volts peak to peak with a frequency range of 3 to 20 herz. The amplitude range of this ramp output signal is determined by the range of input signal A, while the frequency range is determined primarily by the value of the capacitor in the ramp generator.

As illustrated in FIG. 2, an analog signal F, representing the desired frequency of seat vibration, is applied to two parallel input channels of the ramp generator. In the first channel the frequency signal is inverted by an amplifier A1 (R1 = R3) and then passed through a resistor R5. In the second channel the frequency signal is passed directly through a resistor R6. Resistors R5 and R6 are of equal value. The signals on these two channels are then inputted to a switching network comprising an N-channel field effect transistor (FET)Q1, a P-channel FET Q2, diodes CR1, CR2, CR3 and CR4 and biasing resistors R7 and R8. Q1 allows the inverted frequency signal to pass therethrough when its gate G is at a potential of zero or higher. Q2 permits the frequency signal on the second channel to pass therethrough when its gate is at a potential of zero or lower. Diodes CR1 and CR2 serve to regulate the voltage at the source S of the FET's. CR3 and CR4 are blocking diodes designed to prevent a positive signal from reaching the gate of Q1 and a negative signal from reaching the gate of Q2, respectively. R7 and R8 are bias resistors that speed the time it takes Q1 and Q2 to switch.

Figure 3:
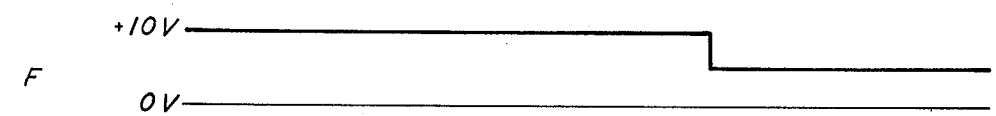
FIG. 3 depicts various waveforms helpful in understanding the invention.
Figure 3:
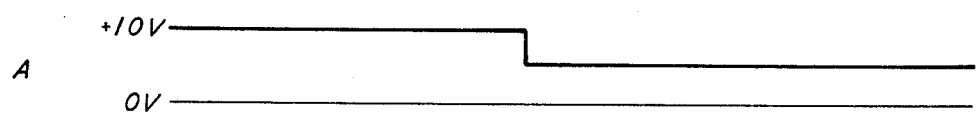
Figure 3:
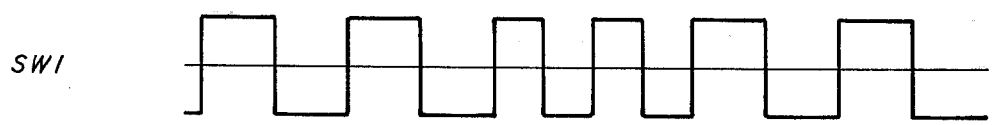
Figure 3:
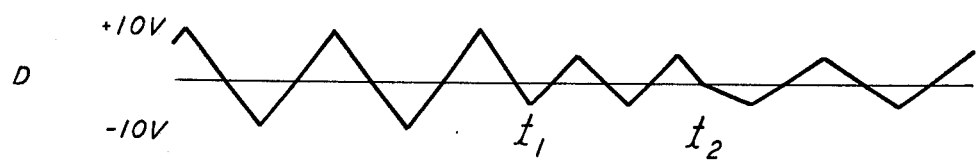
Figure 3:
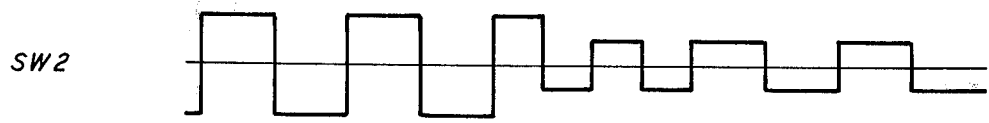
Figure 3:
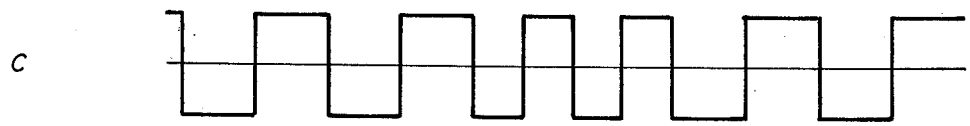

A control signal C, developed as explained hereinafter, is applied at point E to alternately turn on FETs Q1 and Q2. The resulting alternately signed output of the switching network is shown in FIG. 3 as SW1. This output is applied to an integrating amplifier A3.

The output of amplifier A3 is an alternating ramp signal D which is used to drive the hydraulic actuator. The slope of this ramp is determined by the values of the input frequency signal F, R5 and C1. High impedance feedback resistor R9 across amplifier A3 maintains the amplifier output at zero when the amplifier receives no input signal. The output of integrating amplifier A3 is fed to servo amplifier 29 and is also applied to a high gain, summing amplifier A4 through a scaling resistor R12.

The input amplitude signal A is likewise transmitted through inverting and non-inverting channels and matched resistors (R10 = R11) to a second switching network. This switching network, comprising FET's Q3 and Q4, diodes CR5, CR6, CR7 and CR8 and biasing resistors R13 and R14, operates in a manner identical to that described above with respect to the frequency signal. The output SW2 of this second switching network is a wave alternating between a value proportional to A and one proportional to −A. This output is also applied to high gain, summing amplifier A4.

Since amplifier A3 acts not only as an integrator but also as an inverter, the slope of the ramp signal applied to summing amplifier A4 is of opposite sign to SW2. A4 in effect algebraically adds signals D and SW2 and produces a square wave signal C having a fixed amplitude and an instantaneous polarity opposite to that of the sum of the input signals. The output of A4 thus changes polarity whenever the sum of D + SW2 equals zero. As shown in FIG. 2, the output of amplifier A4 is fed back to the switching circuits and controls the operation of the FET's.

The waveforms of FIG. 3 are helpful in explaining the operation of the just-described ramp generator. Assuming Q1 and Q3 are initially conducting, it will be seen that SW1, the signal transmitted by the first switching network, has an initial value proportional to −F. This constant signal is fed to integrating amplifier A3, which produces therefrom a positive going ramp D. This ramp signal is fed to summing amplifier A4, along with SW2, the output of the second switching network. With Q3 conducting, SW2 has a value proportional to −A. Since the output C of amplifier A4 has a polarity opposite to the sum of D and SW2, C has, as shown in FIG. 3, an initial positive value. With C positive, Q1 and Q3 continue to conduct while Q2 and Q4 are gated off.

The value of D increases until it equals SW2. At this time C switches negative. When this occurs, C, which is fed back to the switching networks, shuts off Q1 and Q3 and turns on Q2 and Q4. SW1 then has a value proportional to F and SW2 has a value proportional to A. Amplifier A3 now produces a negative going ramp, which is fed, along with SW2, to summing amplifier A4. When the negative-going ramp reaches a value equal but opposite in sign to SW2, C again changes sign, causing the switching networks to switch and the process to repeat. The alternating ramps produced by the amplifier A3 constitute the desired seat drive signal.

In this manner, a suitable drive signal D, alternating between positive and negative ramp peaks, and having a maximum amplitude determined by input signal A and a frequency proportional to F/A, is produced. The effect upon this drive signal of variations in A and F are illustrated in FIG. 3, at $t_1$ and $t_2$, respectively. It will be noted that when A is halved, the amplitude of drive signal D is halved and the frequency doubled. When F is halved, the frequency of D is halved but the amplitude of D is unchanged.

Figure 4:
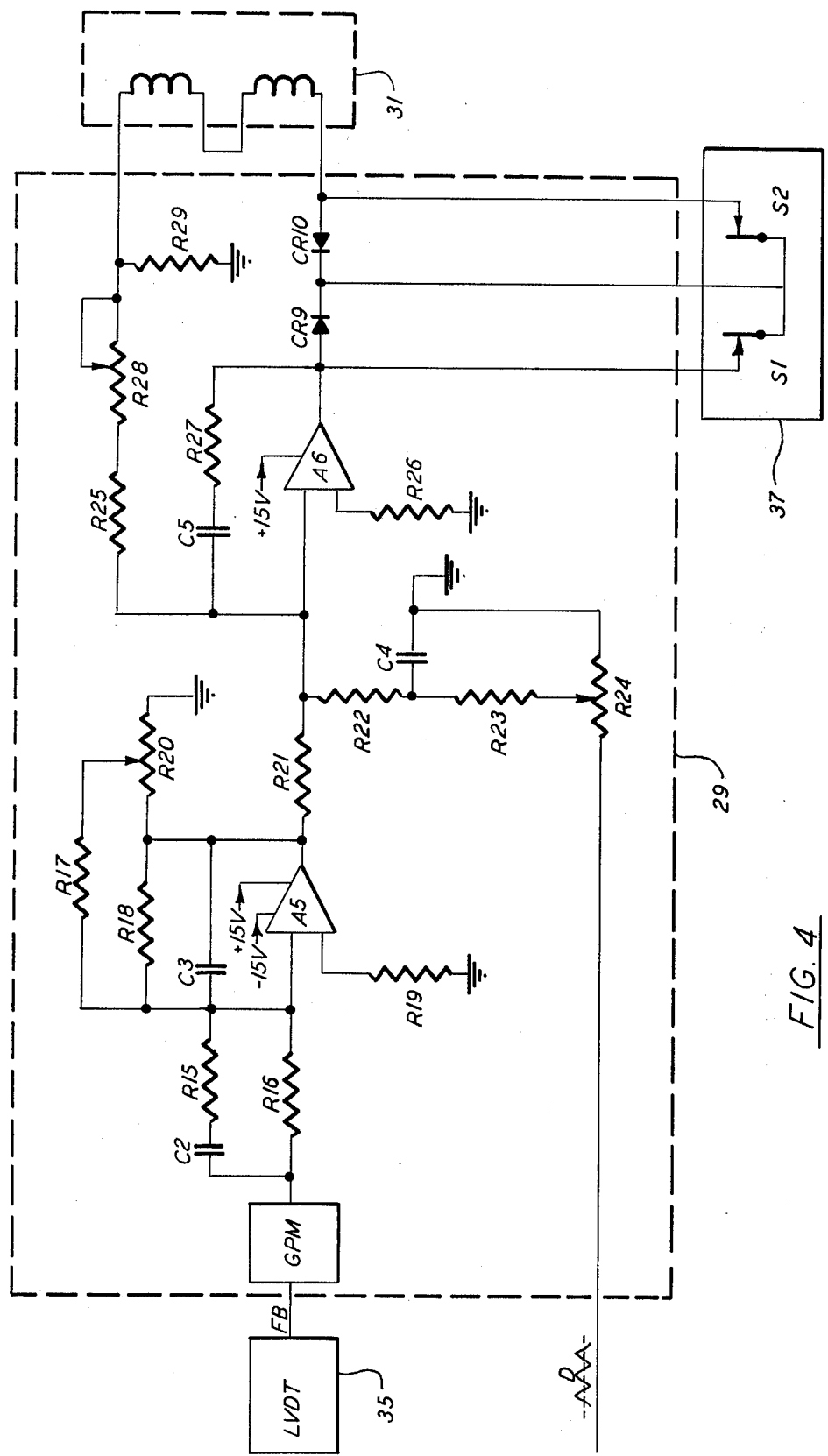
FIG. 4 illustrates a servo amplifier of the current invention.

The drive signal D, produced by the above described voltage controlled ramp generator, is supplied to a servo amplifier such as that illustrated in FIG. 4. This servo amplifier compares the drive signal with a feedback signal from a ram position sensor 35. As a result of this comparison, an error signal is sent to hydraulic valve 31 which will produce a nullifying displacement of the hydraulic actuator ram.

More particularly, drive signal D is applied to a summing amplifier A6 via a set of scaling resistors R22 and R23, a scale adjusting potentiometer R24, and a noise filtering capacitor C4.

A feedback signal from a position sensor 35 forms the other input to summing amplifier A6. A Schaevitz linear variable differential transformer (LVDT), integral with the hydraulic actuator, might serve as a suitable position sensing device. A general purpose module (GPM-101), available from CGS Scientific Corporation of South Hampton, Pennsylvania, is peferably employed in conjunction with the LVDT. This module provides a 5,000 Hz excitation signal to the LVDT, demodulates the signal returned by the LVDT, and produces therefrom a dc output proportional to ram displacement.

The dc signal from the GPM is inverted by an amplifier A5 and then fed through a scaling resistor R21 to summing amplifier A6. A capacitor C2 and resistor R15 may be placed in parallel to input resistor R16 of inverting amplifier A5 to provide dampening. A potentiometer R20 in combination with resistors R17 and R18 provides gain adjustment. Capacitor C3 acts as a filter. A resistor R19 is provided to connect the other input terminal of amplifier A5 to ground.

Since the signal from amplifier A5 has a sign opposite that of drive signal D, summing amplifier A6 produces a difference or error signal. This signal is transmitted to a suitable hydraulic servo valve 31, e.g., a Moog Series 32 servo valve, controlling the flow of hydraulic fluid to actuator 17.

A damping RC circuit comprising capacitor C5 and resistor R27 can be placed across amplifier A6 for stability purposes. Fixed resistors R25 and R29 in conjunction with potentiometer R28 provide current feedback and gain adjustment.

A set of limit switches S1 and S2, in combination with a pair of oppositely poled diodes CR9 and CR10, ensure that seat displacement is kept within safe limits. The diodes in parallel with the switches pass only the proper polarity to drive the seat back into the safe region when a switch is open.

Typical values for the resistors (in ohms) and the capacitors (in farads) of the above described control circuitry follow: R1, R2, R3, R4, R7, R8, R12, R13, R14, R21 = 100K; R5, R6 = 866K; R9 = 10M; R10, R11 = 102K; R15 = 24.9K; R16 = 124K; R17 = 301K; R18 = 1M; R19 = 66.5K; R20 = 10K; R22, R23, R26 = 49.9K; R24 = 5K; R25 = 20K; R27 = 499K; R28 = 200K; R29 = 100 K; C1 = 0.056uf; C2 = 0.1uf; C3, C4 = 470pf; C5 = 0.01uf.

Although particular preferred drive circuitry has been described in detail, it will be apparent to those skilled in the art that numerous alternate circuit arrangements can be employed to drive the hydraulic actuator. For example, instead of the described voltage controlled ramp generator, a variable fequency oscillator (VFO) in combination with a multiplying digital to analog converter (MDAC) may be employed, Equivalent means can similarly be used in place of the illustrative servo system.

The instant invention exhibits a number of significant advantages over earlier buffet simulation systems. The present invention permits seat movement without any loss of cockpit fidelity, interference with normal seat adjustment or exposure of sensitive cockpit area components to vibration damage. Even though the mechanical arrangement of the invention is simple, straightforward and economical, it nevertheless permits larger deflections and more controlled seat motion than other vibration schemes. Moreover, since all of the mechanical hardware for vibrating the seat can be mounted within the fuselage, the current invention is compatible with any motion base. The preferred drive circuitry of the instant invention is closed looped, which not only ensures accurate seat displacement but also limits said displacement to a safe region. Further, the instant invention allows both the frequency and amplitude of seat vibration to vary with simulated flight conditions, as they do during an actual flight, resulting in a more realistic simulation of aircraft buffeting than was previously attainable.

Although the invention has been described in terms of simulating the buffeting felt by a pilot during normal high speed aircraft maneuvers, it can also be used to simulate buffeting experienced by other occupants of an aircraft or produced by other causes, such as air turbulence, storms, gust loading, violent aircraft maneuvers, hard landings, crashes, etc. Similarly, it will be readily apparent to those skilled in the art that numerous modifications may be made to the illustrative embodiments without departing from the scope of the invention, as defined by the claims appended hereto.

What we claim is:

1. Apparatus for simulating, in the cockpit of a flight trainer, the buffeting experienced in an operational aircraft, comprising:
   an ejection rail located within the cockpit of said flight trainer;
   a seat mounted on said ejection rail;
   means fixed relative to said cockpit for supporting said ejection rail from the rear;
   at least one linear bearing oriented along the trainer's z-axis and connecting said ejection rail to said rear supporting means;
   means for jointly vibrating said seat and ejection rail relative to said cockpit along said linear bearing, said vibrating means comprising an hydraulic actuator having a bi-directionally movable ram and means linking said ram to the bottom end of said ejection rail so that ram movement is translated into z-axis seat movement, said vibrating means being located within said cockpit, said hydraulic actuator being disposed perpendicular to said z-axis, and said linking means comprising a rotatable bell crank and a link; and
   means for controlling the frequency and amplitude of said vibration in such a way as to provide an occupant of said seat with vibration sensations similar to those experienced in the operational aircraft during buffeting.

2. The apparatus of claim 1, wherein said rear supporting means comprises a bulkhead of said cockpit and further including a second linear bearing oriented along said z-axis and connecting said ejection rail to said bulkhead.

3. The apparatus of claim 1, wherein said controlling means comprises means for controlling the operation of said hydraulic actuator so that the actuator produces a seat vibration having a frequency and amplitude which vary with simulated flight conditions.

4. The apparatus of claim 3, wherein said frequency and amplitude of seat vibration are made to vary with simulated angle of attack.

5. The apparatus of claim 4, wherein said controlling means comprises:
   computing means for deriving a vibration frequency signal and a vibration amplitude signal that are functions of simulated angle of attack;
   means for processing said signals to produce a ramp drive signal therefrom; and
   a closed loop servo system for receiving said drive signal and controlling the operation of said hydraulic actuator in response to said drive signal.

6. The apparatus of claim 5, wherein said processing means comprises a voltage controlled ramp generator, said ramp generator producing a drive signal having an amplitude directly proportional to said vibration amplitude signal and a frequency directly proportional to said vibration frequency signal and inversely proportional to said vibration amplitude signal; and said servo system comprises:

a servo valve controlling the flow of hydraulic fluid to the hydraulic actuator, a position sensor for monitoring the actual movement of the actuator ram and providing a feedback signal representative of said actual movement, and a servo amplifier for receiving and comparing said drive signal and said feedback signal and providing an output signal, representative of the difference between said feedback signal and said drive signal, to said servo valve.

7. The apparatus of claim 6 wherein said voltage controlled ramp generator comprises:

first inverting means for inverting said frequency signal;

second inverting means for inverting said amplitude signal;

first switching means for alternately transmitting said frequency signal and said inverted frequency signal;

integrating means for receiving the output of said first switching means and producing a ramp signal therefrom having a slope of opposite sign to said output;

second switching means for alternately transmitting said amplitude signal and said inverted amplitude signal; and summing means for algebraically adding said ram signal and the output of said second switching means, said summing means producing a square wave signal having a polarity opposite to that of the sum of the ram signal and the output of said second switching means, said square wave signal being fed back to said first and second switching means to control the switching thereof.

8. The apparatus of claim 6 further including at least one limit switch for deactivating said hydraulic actuator should seat movement exceed a predetermined safe range.

* * * * *

UNITED STATES PATENT AND TRADEMARK OFFICE
CERTIFICATE OF CORRECTION

PATENT NO. : 4,030,208
DATED : June 21, 1977
INVENTOR(S) : Fred F. Carver et al

It is certified that error appears in the above-identified patent and that said Letters Patent are hereby corrected as shown below:

Col. 4, line 47, "( Z )" should be -- ( $\ddot{Z}$ )--

Col. 4, line 62, "20" should be --29--.

Col. 10, line 11, "ram" should be --ramp--.

Col. 10, line 15, "ram" should be --ramp--.

Signed and Sealed this

Fourth Day of October 1977

[SEAL]

Attest:

RUTH C. MASON
Attesting Officer

LUTRELLE F. PARKER
Acting Commissioner of Patents and Trademarks